United States Patent [19]
Kibune

[11] Patent Number: 5,172,356
[45] Date of Patent: Dec. 15, 1992

[54] SEPARATION TYPE OPTICAL PICKUP DEVICE

[75] Inventor: Hideaki Kibune, Yokohama, Japan

[73] Assignee: Ricoh Company, Ltd., Tokyo, Japan

[21] Appl. No.: 703,022

[22] Filed: May 20, 1991

[30] Foreign Application Priority Data

Jun. 7, 1990 [JP] Japan .................................. 2-149072

[51] Int. Cl.$^5$ .............................................. G11B 7/12
[52] U.S. Cl. .............................. 369/44.14; 369/44.17; 369/112
[58] Field of Search ............... 369/44.14, 44.12, 44.17, 369/44.19, 44.21, 44.22, 44.32, 52, 111, 112, 114, 119, 44.11, 44.28, 1.6, 32; 358/202, 205, 206; 359/872, 876; 372/107

[56] References Cited

U.S. PATENT DOCUMENTS

| | | | |
|---|---|---|---|
| 4,507,766 | 3/1985 | Saimi et al. | |
| 4,621,351 | 11/1986 | Baer et al. | 369/112 |
| 4,688,201 | 8/1987 | Towner et al. | 369/112 |
| 4,959,824 | 9/1990 | Ueda et al. | 369/44.14 |
| 4,977,552 | 12/1990 | Gotoh | 369/44.14 |

FOREIGN PATENT DOCUMENTS 24253 6/1987 Japan .

Primary Examiner—Robert Weinhardt
Assistant Examiner—Muhammad Edun
Attorney, Agent, or Firm—Cooper & Dunham

[57] ABSTRACT

A separation type optical pickup device divided to a fixed optical unit and a movable optical unit. The device comprises an optical output system for emitting an optical beam arranged in the fixed unit. An optical detection system is arranged in the fixed unit. A focusing system is arranged in the movable unit for forming an optical spot on an information record medium. A deflection member is arranged in the fixed unit for deflecting and guiding the beam emitted from the optical output system to the movable unit. The member has a deflection surface which is universally rotatable about a deflection point thereof. An optical axis adjuster mechanism is arranged in the fixed unit for shifting and adjusting the optical output system in a direction perpendicular to an optical axis thereof.

11 Claims, 2 Drawing Sheets

SEPARATION TYPE OPTICAL PICKUP DEVICE

BACKGROUND OF THE INVENTION

1. Field of the Invention

The present invention relates to a separation type optical pickup device.

2. Description of the Related Art

An example of the separation type optical pickup device is described hereinafter.

First, within a fixed optical system unit having a light emission system disposed in the fixed system unit, a laser beam emitted from a laser diode is collimated by a coupling lens and passes through a polarization beam splitter and a quarter-wave plate to reach a deflection prism. The beam deflected by the deflection prism impinges to a tracking mirror which deflects the beam again to output the beam out of the fixed unit toward a movable optical system unit.

The beam entered in the movable unit is deflected by a deflection prism mounted on the movable system and guided to an objective lens which converges the beam on an optical disk surface to form a minute spot thereon so as to read/write information from or in the disk.

The beam is reflected on the disk surface. The reflection beam reflected from the disk surface is collimated by the objective lens and guided back to the fixed optical unit. The reflection beam is deflected in the fixed unit by the tracking mirror and then by the deflection prism and enters in the polarization beam splitter after passing through the quarter-wave plate. In this event, the polarization direction of the reflection beam to be entered into the beam splitter is rotated by 90 degrees from the beam at the time of emission from the laser source. Therefore, the beam is deflected by the beam splitter and guided to a signal detection optical system. In the detection system, the beam is converged by a condenser lens and passes through a cylindrical lens which generates astigmatism in the beam, whereby it becomes possible to detect information data recorded in the disk, a focus error signal and a track error signal from the reflection beam by a photo detector.

The separation type optical pickup device mentioned above comprises a tracking actuator housed in the fixed unit for adjusting the tracking mirror. The pickup device also comprises a focus actuator housed in the movable unit for driving and adjusting the objective lens along the direction of the optical axis thereof.

In accordance with the optical pickup device mentioned above, if the optical axis of the beam output from the fixed unit to the movable unit is not accurately aligned with the moving direction of the movable unit, the optical axis of the beam received by the photo detector is shifted depending on the seeking position of the movable unit. Also, if the optical axis of the beam is dislocated from the center of the objective lens after passing through the deflection prism in the movable unit, the track error signal detected by the photo detector is offset due to the dislocation of the optical axis of the beam. Therefore, it is necessary to adjust the optical elements so that the optical axis of the beam transmitted from the fixed unit to the movable unit is strictly in parallel to the moving direction of the movable unit and coincides with the center axis of the objective lens.

For that purpose, the tracking actuator is arranged to adjust the tracking mirror by shifting and rotating the mirror so as to correct the optical axis of the beam incident to the objective lens along the direction of X-axis and control the optical axis of the beam transmitted from the fixed unit about the Y-axis.

Also, in that case, the optical axis of the beam incident to the objective lens is adjusted along the direction of Y-axis by moving whole of the optical output system including the laser diode and the coupling lens along the Y-axis. Further, the optical axis of the beam transmitted from the fixed unit is adjusted about the Z-axis by shifting the laser diode with respect to the coupling lens along the direction of Y-axis.

However, in accordance with the above-mentioned way of adjusting the optical axis of the beam, the adjusting mechanism is directly provided on the tracking actuator which drives the tracking mirror as a result of which the actuator becomes bulky.

Besides, in accordance with the adjusting way, it becomes necessary to individually adjust apart from each other the inclination, location and alignment along the X-axis and Y-axis with respect to the optical axis of the beam incident to the objective lens and the optical axis of the beam transmitted from the fixed unit. Therefore, a problem arises wherein the adjustment results interfere with each other so that when the optical axis inclination along one direction is adjusted and after that the optical axis inclination along another direction is adjusted, the optical axis along the first direction becomes dislocated again from the position where it should be.

SUMMARY OF THE INVENTION

It is therefore an object of the present invention to provide an optical pickup device in which a compact and simplified tracking actuator is realized and the adjustment of the optical axis can be easily achieved.

The above-mentioned object of the present invention can be achieved by a separation type optical pickup device divided to a fixed optical unit and a movable optical unit, the device comprising:

an optical output system for emitting an optical beam arranged in the fixed unit;

an optical detection system arranged in the fixed unit;

a focusing system arranged in the movable unit for forming an optical spot on an information record medium;

a tracking system arranged in the fixed unit for tracking the optical spot on the record medium;

a deflection member arranged in the fixed unit for deflecting and guiding the beam flux emitted from the optical output system to the movable unit, the member having a deflection surface which is universally rotatable about a deflection point thereof; and an optical axis adjuster mechanism arranged in the fixed unit for shifting and adjusting the optical output system in a direction perpendicular to an optical axis thereof.

More precisely, the optical pickup device in accordance with the present invention comprises: a fixed optical unit which comprises; an optical emission system including a laser diode and a coupling lens; and a signal detection optical system for detecting a reading signal, a focus error signal and a track error signal from the reflection light reflected from an optical information recording medium; and a movable optical unit including an objective lens for converging the light transmitted from the fixed unit on the record medium to form a minute spot thereon, wherein a tracking mirror is arranged in the fixed unit to control the tracking motion of the optical spot formed by the objective lens and a deflection member is disposed in the fixed unit to deflect the light guided into the movable unit through the tracking mirror in such a manner that the deflection member is rotatable about its deflection point and supported by an adjuster mechanism so that the optical beam emitted from the fixed unit to the movable unit can be shifted by an optical axis adjuster mechanism in the direction perpendicular to the optical axis of the beam.

Further, the optical pickup device in accordance with the present invention comprises: a fixed optical unit which comprises; an optical emission system including a laser diode and a coupling lens; and a signal detection optical system for detecting a reading signal, a focus error signal and a track error signal from the reflection light reflected from an optical information recording medium; and a movable optical unit including an objective lens for converging the light transmitted from the fixed unit on the record medium to form a minute spot thereon, wherein a tracking mirror is arranged in the fixed unit to control the tracking motion of the optical spot formed by the objective lens and a deflection member is disposed in the fixed unit to deflect the light guided into the movable unit through the tracking mirror in such a manner that the deflection member is rotatable about its deflection point and supported by an adjuster mechanism, and wherein a movable portion including at least an optical output system is provided in the fixed unit in such a manner that the movable portion is supported by an adjuster mechanism so that the portion can be movable in a plane perpendicular to the optical axis of the beam emitted from the laser source.

Advantages of the present invention are that it becomes possible to realize an optical pickup device having a small and simplified tracking actuator and that the interference between the adjustments of the optical axis is attenuated so that it becomes possible to easily adjust the optical axis of the beam. This is due to the arrangement wherein the inclination of the optical axis of the beam from the fixed unit is adjusted with respect to the two directions by the adjuster mechanism for adjusting the deflection member and wherein the position of the optical axis of the beam incident to the objective lens is adjusted with respect to the two directions by the optical axis adjuster mechanism disposed in the fixed unit, which makes it unnecessary to directly attach the optical axis adjuster mechanism to the tracking actuator.

Further, in accordance with the present invention, in addition to that it becomes possible to adjust the inclination of the optical axis of the beam output from the fixed unit by the deflection member adjuster mechanism, it becomes possible as well to adjust the position of the optical axis of the beam incident to the objective lens by shifting the movable portion including the optical output system in a plane perpendicular to the optical axis of the output beam by the adjuster mechanism for adjusting the movable portion. Therefore, it becomes possible to adjust each of the inclination and the position of the optical axis at one adjuster portion, respectively. This also attenuates the interference between the optical axis adjustments and makes it possible to easily adjust the optical axis.

Further objects and advantages of the present invention will be apparent from the following description of the preferred embodiments of the invention as illustrated in the accompanying drawings.

DESCRIPTION OF THE PREFERRED EMBODIMENTS

Figure 1:
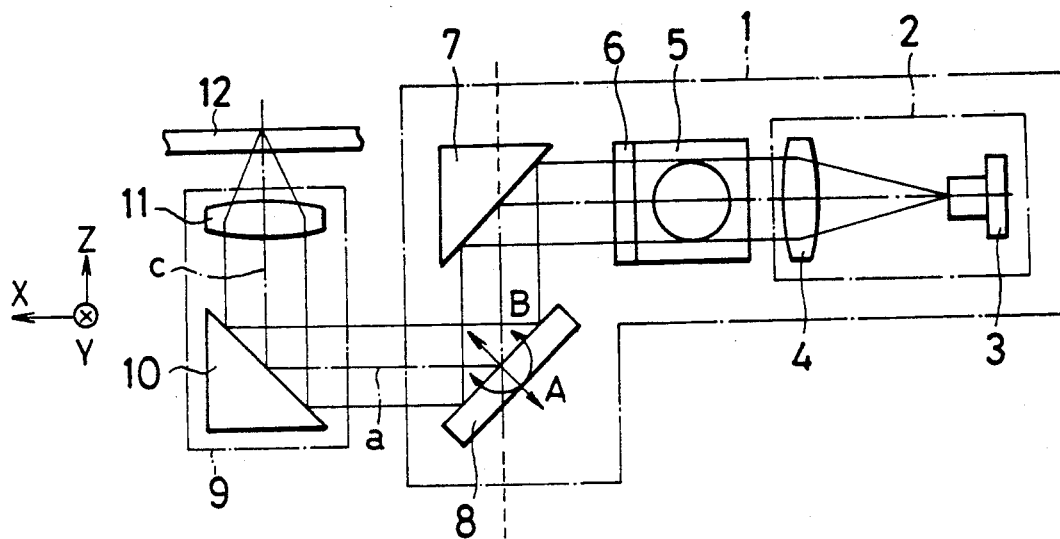
FIG. 1 is a constructional side view of an example of the separation type optical pickup device.

Embodiments of the present invention are described hereinafter in detail with reference to the drawings in comparison to the related art which is also described referring to the drawings.

An example of the separation type optical pickup device is described hereinafter with reference to FIGS. 1 and 2.

First, within a fixed optical system unit 1 having a light emission system 2 disposed in the fixed system unit 1, a laser beam emitted from a laser diode 3 is collimated by a coupling lens 4 and passes through a polarization beam splitter 5 and a quarter-wave plate 6 to reach a deflection prism 7. The beam deflected by the deflection prism 7 impinges to a tracking mirror 8 which deflects the beam again to output the beam out of the fixed unit 1 toward a movable optical system unit 9.

The beam entered in the movable unit 9 is deflected by a deflection prism 10 mounted on the movable system 9 and guided to an objective lens 11 which converges the beam on a surface of an optical disk 12 to form a minute optical spot thereon so as to read/write information from or in the disk 12.

The beam is reflected on the disk surface. The reflection beam reflected from the disk surface is collimated by the objective lens 11 and guided back to the fixed optical unit 1. The reflection beam is deflected in the fixed unit 1 by the tracking mirror 8 and then by the deflection prism 7 and enters in the polarization beam splitter 5 after passing through the quarter-wave plate 6. In this event, the polarization direction of the reflection beam to be entered into the beam splitter 5 is rotated by 90 degrees from the beam at the time of emission from the laser source 3. Therefore, the beam is deflected by the beam splitter 5 and guided to a signal detection optical system 13. In the detection system 13, the beam is converged by a condenser lens 14 and passes through a cylindrical lens 15 which generates astigmatism in the beam, whereby it becomes possible to detect information data recorded in the disk 12, a focus error signal and a track error signal from the reflection beam by a photo detector 16.

The separation type optical pickup device mentioned above comprises a not shown tracking actuator housed in the fixed unit 1 for adjusting the tracking mirror 8. The pickup device also comprises a not shown focus actuator housed in the movable unit 9 for driving and adjusting the objective lens 11 along the direction of the optical axis thereof.

In accordance with the optical pickup device mentioned above, if the optical axis a of the beam output from the fixed unit 1 to the movable unit 9 is not accurately aligned with the moving direction of the movable unit 9, the optical axis b of the beam received by the photo detector 16 is shifted depending on the seeking position of the movable unit 9. Also, if the optical axis c of the beam is dislocated from the center of the objective lens 11 after being deflected by the deflection prism 10 in the movable unit 9, the track error signal detected by the photo detector 16 is offset due to the dislocation of the optical axis of the beam. Therefore, it is necessary to adjust the optical elements so that the optical axis of the beam transmitted from the fixed unit 1 to the movable unit 9 is strictly in parallel to the moving direction of the movable unit 9 and coincides with the center axis of the objective lens 11.

Figure 2:
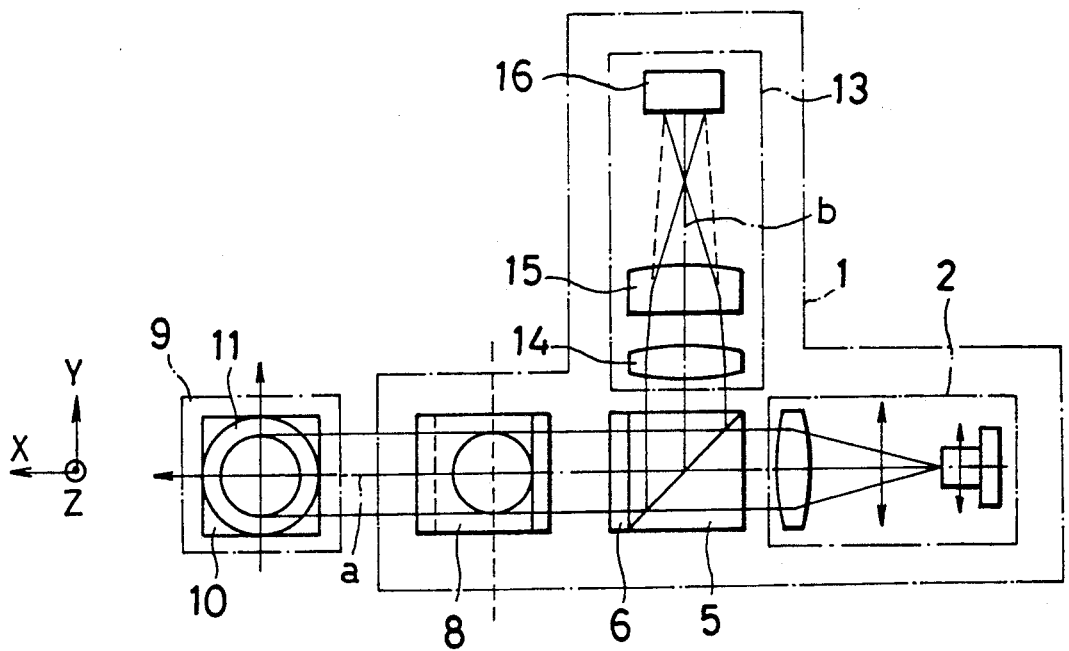
FIG. 2 is a plan view of the optical pickup device of FIG. 1.

For that purpose, the tracking actuator is arranged to adjust the tracking mirror 8 by shifting and rotating the mirror as illustrated by arrows A and B, respectively, in FIG. 1, so as to correct the optical axis c of the beam incident to the objective lens 11 along the direction of X-axis and control the optical axis a of the beam transmitted from the fixed unit 1 about the Y-axis.

Also, in that case, the optical axis c of the beam incident to the objective lens 11 is adjusted along the direction of Y-axis by moving whole of the optical output system 2 including the laser diode 3 and the coupling lens 4 along the Y-axis. Further, the optical axis a of the beam transmitted from the fixed unit 1 is adjusted about the Z-axis by shifting the laser diode 3 with respect to the coupling lens 4 along the direction of Y-axis.

However, in accordance with the above-mentioned way of adjusting the optical axis of the beam, the adjusting mechanism is directly provided on the tracking actuator which drives the tracking mirror 8, as a result of which the actuator becomes bulky.

Besides, in accordance with the above-mentioned adjusting way, it becomes necessary to individually adjust apart from each other the inclination, location and alignment along the X-axis and Y-axis with respect to the optical axis c of the beam incident to the objective lens 11 and the optical axis a of the beam transmitted from the fixed unit 1. Therefore, a problem arises wherein the adjustment results interfere with each other so that when the optical axis inclination along one direction is adjusted and after that the optical axis inclination along another direction is adjusted, the optical axis along the first direction becomes dislocated again from the position where it should be.

The embodiment of the present invention described below obviates the problems mentioned above.

Figure 3:
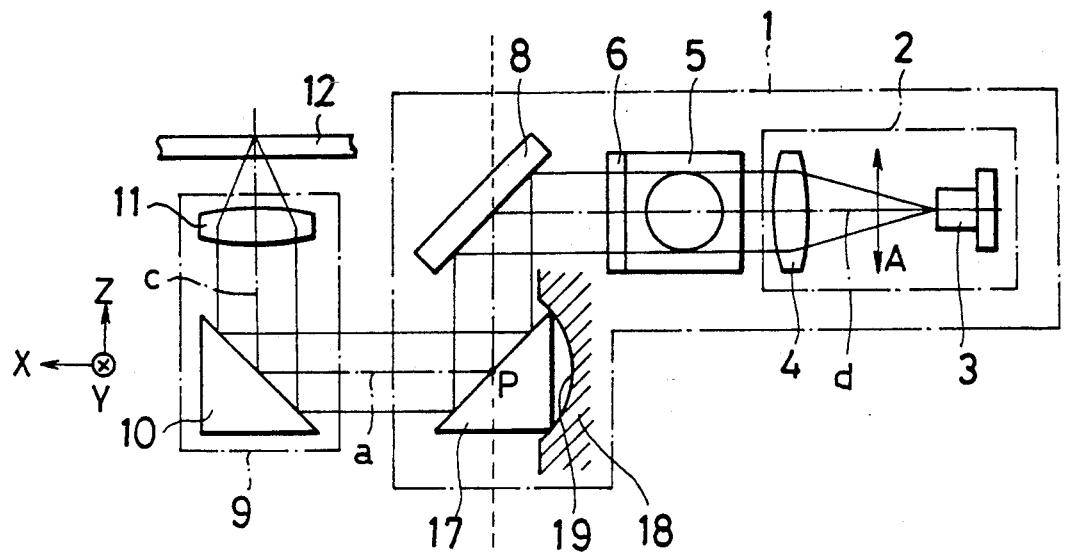
FIG. 3 is a constructional side view of an embodiment of the separation type optical pickup device in accordance with the present invention.
Figure 4:
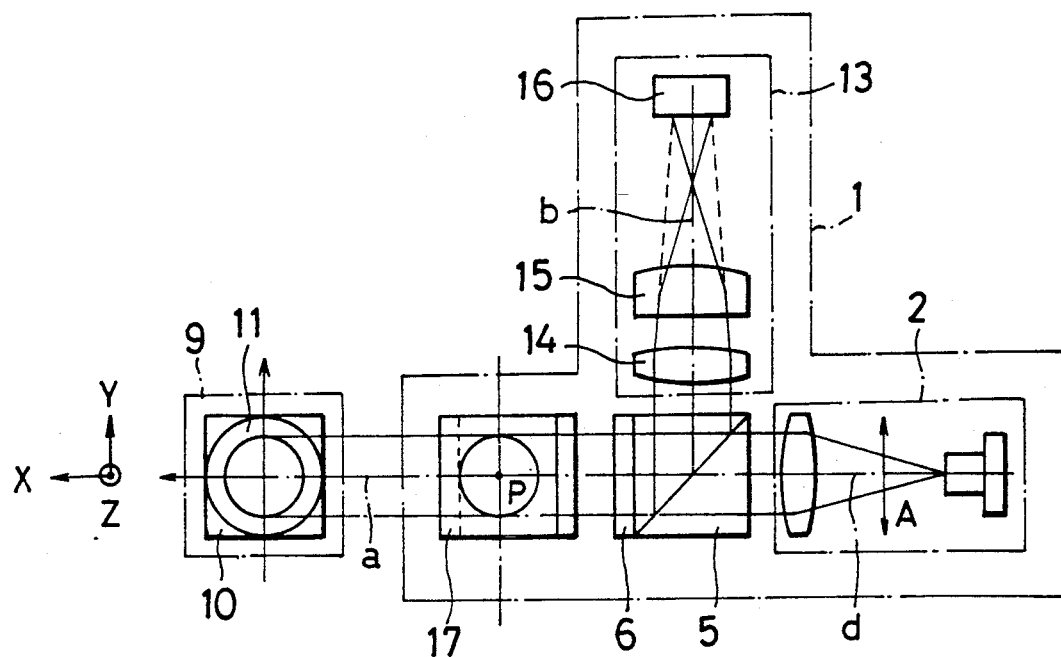
FIG. 4 is a plan view of the optical pickup device of FIG. 3.

FIGS. 3 and 4 illustrate the embodiment of the optical pickup device in accordance with the present invention. The same or corresponding parts are designated by the same numerals as the device of FIGS. 1 and 2.

The light emitted from the laser diode 3 disposed in the optical beam output system 2 passes through the polarization beam splitter 5 and the quarter-wave plate 6 and reaches the tracking mirror 8 which deflects the light beam. On the optical path of the beam deflected by the mirror 8 is disposed a deflection prism 17. The prism 17 is supported by a deflection member adjuster mechanism 18 in such a manner that the prism is universally rotatable about the deflection point P of the prism. In this particular embodiment, the mechanism 18 is composed of a spherical seat 19 having a rotary center at the point P.

The optical system 2 which comprises the laser diode 3 and the coupling lens 4 is movable, as indicated by a double-head arrow A in FIGS. 3 and 4, in the plane perpendicular to the optical axis d of the beam emitted from the laser diode 3 by a not shown optical axis adjuster mechanism.

In accordance with the above-mentioned structure, the inclination of the optical axis a of the beam output from the fixed unit 1 can be adjusted both about the Y-axis and Z-axis by rotating the prism 17 about the deflection point P. Also, the position of the optical axis c of the beam incident to the objective lens 11 can be adjusted by moving whole of the system 2 in two directions in the plane perpendicular to the optical axis d by the adjuster mechanism (not shown).

Therefore, it becomes unnecessary to directly attach the optical axis adjuster mechanism to the tracking actuator (not shown) which drives the tracking mirror 8, which makes it possible to simplify the structure and realize a small and compact optical pickup system.

That is, in other words, the inclination of the optical axis a of the beam output from the unit 1 can be adjusted with respect to the two directions by rotating the prism 17 about its deflection point P. Also, the position of the optical axis c of the beam incident to the objective lens 11 can be adjusted with respect to the two directions by shifting the whole system 2 in the two directions in the plane perpendicular to the optical axis d of the beam emitted from the laser diode 3.

Due to the above-mentioned arrangement, it becomes unnecessary to attach the optical adjuster mechanism to the tracking actuator, which makes it possible to realize a small and simplified structure of the tracking actuator. Besides, the inclination and position of the optical axes a and c can be adjusted by one adjuster mechanism, which attenuates the interference between the optical axis adjustments and enables to adjust the optical axes further easily.

The rotation of the prism 17 can be adjusted by the mechanism 18 which is, for example, arranged as follows. The prism 17 is secured to a holder, for example, having a semispherical surface with the deflection point P being coincident with the sphere center of the holder. A spherical seat is provided in the unit 1 so that the holder is mounted on the seat. The holder is slidable on the seat so that the holder can be rotated about the point P by sliding on the spherical seat. The inclination of the prism 17 is adjusted by rotating the holder and then securing the holder to the seat by means of screws, for example.

The position of the optical axis c can be adjusted not only by the way mentioned before but also as follows. The system 2 is arranged movable. An arrangement is made so that the movable system is adjusted by an adjuster mechanism disposed at one position other than the position of tracking actuator.

Also, the tracking mirror 8 may be disposed in the unit 9 instead of the unit 1 as is the case mentioned above. Also, the prism 17 may be disposed on the optical path between the tracking mirror 8 and the quarter-wave plate 6 instead of the mirror 8 and the prism 10 of the unit 9 as is the case of the above mentioned embodiment.

As mentioned above, in accordance with the present invention, the optical pickup device comprises: a fixed optical unit which comprises; an optical emission system including a laser diode and a coupling lens; and a signal detection optical system for detecting a reading signal, a focus error signal and a track error signal from the reflection light reflected from an optical information recording medium; and a movable optical unit including an objective lens for converging the light transmitted from the fixed unit on the record medium to form a minute spot thereon, wherein a tracking mirror is arranged in the fixed unit to control the tracking motion of the optical spot formed by the objective lens and a deflection member is disposed in the fixed unit to deflect the light guided into the movable unit through the tracking mirror in such a manner that the deflection member is rotatable about its deflection point and supported by an adjuster mechanism so that the optical beam emitted from the fixed unit to the movable unit can be shifted by an optical axis adjuster mechanism in the direction perpendicular to the optical axis of the beam. Therefore, it becomes possible to realize an optical pickup device having a small and simplified tracking actuator and that the interference between the adjustments of the optical axis is attenuated so that it becomes possible to easily adjust the optical axis of the beam. This is due to the arrangement wherein the inclination of the optical axis of the beam from the fixed unit is adjusted with respect to the two directions by the adjuster mechanism for adjusting the deflection member and wherein the position of the optical axis of the beam incident to the objective lens is adjusted with respect to the two directions by the optical axis adjuster mechanism disposed in the fixed unit, which makes it unnecessary to directly attach the optical axis adjuster mechanism to the tracking actuator.

Further, the optical pickup device in accordance with the present invention comprises: a fixed optical unit which comprises; an optical emission system including a laser diode and a coupling lens; and a signal detection optical system for detecting a reading signal, a focus error signal and a track error signal from the reflection light reflected from an optical information recording medium; and a movable optical unit including an objective lens for converging the light transmitted from the fixed unit on the record medium to form a minute spot thereon, wherein a tracking mirror is arranged in the fixed unit to control the tracking motion of the optical spot formed by the objective lens and a deflection member is disposed in the fixed unit to deflect the light guided into the movable unit through the tracking mirror in such a manner that the deflection member is rotatable about its deflection point and supported by an adjuster mechanism, and wherein a movable portion including at least an optical output system is provided in the fixed unit in such a manner that the movable portion is supported by an adjuster mechanism so that the portion can be movable in a plane perpendicular to the optical axis of the beam emitted from the laser source. Therefore, in addition to that it becomes possible to adjust the inclination of the optical axis of the beam output from the fixed unit by the deflection member adjuster mechanism, it becomes possible as well to adjust the position of the optical axis of the beam incident to the objective lens by shifting the movable portion including the optical output system in a plane perpendicular to the optical axis of the output beam by the adjuster mechanism for adjusting the movable portion. Therefore, it becomes possible to adjust each of the inclination and the position of the optical axis at one adjuster portion, respectively. This also attenuates the interference between the optical axis adjustments and makes it possible to easily adjust the optical axis.

Many widely different embodiments of the present invention may be constructed without departing from the spirit and scope of the present invention. It should be understood that the present invention is not limited to the specific embodiments described in the specification, except as defined in the appended claims.

What is claimed is:

1. A separation type optical pickup device divided into a fixed optical unit and a movable optical unit, the device comprising:
   an optical output system for emitting an optical beam arranged in said fixed unit;
   an optical detection system arranged in said fixed unit;
   a focusing system arranged in said movable unit for forming an optical spot on an information record medium;
   a deflection member arranged in said fixed unit for deflecting and guiding said beam emitted from said optical output system to said movable unit, said member having a deflection surface which is universally rotatable about a deflection point thereof for adjusting said optical beam; and
   an optical axis adjuster mechanism arranged in said fixed unit for shifting and adjusting said optical output system in at least one of the directions perpendicular to an optical axis thereof;
   wherein said deflection member is slidably held by a spherical seat means having a sphere center point coincident with the deflection point of the member so that the member is rotatable about the center point along the seat surface.

2. A separation type optical pickup device according to claim 1, wherein said optical axis adjuster mechanism comprises means for shifting the position of said beam in a plane perpendicular to the optical axis thereof.

3. A separation type optical pickup device according to claim 1, wherein said optical output system comprises a laser diode for emitting a laser beam and a coupling lens for collimating said laser beam.

4. A separation type optical pickup device according to claim 1, wherein a beam splitter means is disposed in said fixed unit to diverge and guide the beam reflected from said information record medium to said optical detection system.

5. A separation type optical pickup device according to claim 1, wherein said deflection member comprises a prism.

6. A separation type optical pickup device divided into a fixed optical unit and a movable optical unit, the device comprising:
   an optical output system arranged in said fixed optical unit for emitting an optical beam having an optical axis;
   a focusing system arranged in said movable optical unit for forming an optical spot on an information record medium;
   a tracking system arranged in said fixed optical unit for tracking said optical spot on said information record medium;
   an optical detection system arranged in said fixed optical unit for detecting the reflection of said optical spot from said information record medium;
   a deflection member arranged in said fixed optical unit for deflecting and guiding said optical beam emitted from said optical output system to said movable optical unit, said deflection member having a deflection surface being rotatable around a deflection point thereof for adjusting said deflected and guided optical beam; and
   an optical axis adjuster mechanism arranged in said fixed optical unit for shifting and adjusting said optical output system in two directions orthogonal to each other and perpendicular to the optical axis of said output optical system.

7. A separation type optical pickup device according to claim 6, wherein said optical axis adjuster mechanism comprises a means for shifting said optical output system in a plane perpendicular to the optical axis thereof.

8. A separation type optical pickup device according to claim 6, wherein said optical output system comprises a laser diode for emitting a laser beam and a coupling lens for collimating said laser beam.

9. A separation type optical pickup device according to claim 6, wherein said deflection member is slidably held by a spherical seat means having a sphere center point coincident with the deflection point of the deflection member so that the deflection member is rotatable around the center point along a surface of the spherical seat means.

10. A separation type optical pickup device according to claim 6, wherein said deflection member comprises a prism.

11. A separation type optical pickup device according to claim 6, which further comprises a beam splitter means arranged in said fixed unit for diverging and guiding the optical spot reflected from said information record medium to said optical detection system.

* * * * *